US012661661B2

(12) United States Patent
Edwards

(10) Patent No.: US 12,661,661 B2
(45) Date of Patent: Jun. 23, 2026

(54) COMBINATION GRINDER AND FILLING APPARATUS

(71) Applicant: Louie B. Edwards, Redmond, WA (US)

(72) Inventor: Louie B. Edwards, Redmond, WA (US)

( * ) Notice: Subject to any disclaimer, the term of this patent is extended or adjusted under 35 U.S.C. 154(b) by 214 days.

(21) Appl. No.: 18/277,163

(22) PCT Filed: Feb. 24, 2022

(86) PCT No.: PCT/US2022/017681
§ 371 (c)(1),
(2) Date: Aug. 14, 2023

(87) PCT Pub. No.: WO2022/182859
PCT Pub. Date: Sep. 1, 2022

(65) Prior Publication Data

US 2024/0109075 A1 Apr. 4, 2024

Related U.S. Application Data

(60) Provisional application No. 63/272,042, filed on Oct. 26, 2021, provisional application No. 63/153,038, filed on Feb. 24, 2021.

(51) Int. Cl.

| | |
|---|---|
| ***B02C 18/16*** | (2006.01) |
| ***A24C 5/06*** | (2006.01) |
| ***A47J 42/24*** | (2006.01) |
| ***A47J 42/34*** | (2006.01) |
| ***A47J 42/40*** | (2006.01) |
| ***B02C 18/08*** | (2006.01) |
| ***B02C 19/00*** | (2006.01) |

(52) U.S. Cl.
CPC .......... *B02C 18/16* (2013.01); *B02C 19/0056* (2013.01)

(58) Field of Classification Search
CPC ..... B02C 18/16; B02C 18/08; B02C 19/0056; A47J 42/24; A47J 42/34; A47J 42/40
See application file for complete search history.

(56) References Cited

U.S. PATENT DOCUMENTS

| | | | | |
|---|---|---|---|---|
| 11,178,905 B2 * | 11/2021 | Karim | ...................... | A24C 5/42 |
| 2018/0213838 A1 * | 8/2018 | Richmond | ............... | A24B 7/04 |
| 2018/0344086 A1 * | 12/2018 | Mcdonough Migale | .................... | A47J 42/24 |

* cited by examiner

*Primary Examiner* — Mohammed S. Alawadi
(74) *Attorney, Agent, or Firm* — Dean A. Craine

(57) ABSTRACT

A combination grinder and filling apparatus for plant material used to deposit small particles of plant material into a pre-formed cone. The apparatus includes a rotating end cap mounted over a grinder body. Formed on the grinder body is a filling cavity in which bulk plant material is placed. Formed in the end cap or grinder body are knives that cut the plant material when the end cap is placed on the grinder body and rotated. Located under the grinder body is a collection plate with holes that allow small particles to fall into a conical-shaped receiving cavity formed on a collection body. Attached to the collection body is a lower end cap with a lower bore in which the lower neck of the collection body extends. Pressing arms located on the lower end cap automatically press against a pre-rolled cone extended around the lower neck. A plunger extends through the apparatus to pack small particles of plant material into the pre-rolled cone. An agitator coupled to the plunger is positioned in the receiving cavity and used to break up small plant particles.

11 Claims, 7 Drawing Sheets

COMBINATION GRINDER AND FILLING APPARATUS

TECHNICAL FIELD

This invention pertains to apparatus that grinds tobacco and other plant material to be smoked and then used to dispense the material into pre-rolled cones.

BACKGROUND ART

Plant material must be ground into small particles to be used or consumed. In some instances, it is best to store the plant material in bulk configuration and grind it into small particles immediately before consumption.

Some bulk and grounded plant material should be stored in a dark, cool location to undergo less decomposition and retain its potency and flavor. For example, bulk and fine tobacco particles usually are distributed and sold to consumers in dark, sealed containers. Consumers will remove a desired amount of tobacco from the sealed container to make one or two cigarettes using sheets of cigarette paper or pre-rolled cones.

Pre-rolled cones are conical-shaped with a narrow end opening and a wide end opening. A wide end opening is desirable because it creates a uniform amount of inhaled smoke as the tobacco is burned and also allows tobacco particles to be easily packed inside the pre-rolled cone through the wide end opening using a stick. Many pre-rolled cone manufacturers offer a filter located in the narrow end of the pre-rolled cone.

What is needed is a combination grinder and dispenser for a pre-rolled cone.

DISCLOSURE OF THE INVENTION

A combination grinder and filling apparatus for grinding plant material into small particles and then dispensing the small particles into pre-rolled cones.

The apparatus includes an upper end cap mounted over a grinder body. Formed between the upper end cap and the grinder body is a grinding cavity in which bulk plant material is placed. Inside the grinding cavity is a plurality of knives that cut the bulk plant material into small particles when the upper end cap is rotated over the grinder body.

Located below the grinder body is a transversely aligned collection plate with small holes. The holes enable small particles of plant material to fall into a receiving cavity formed in a collection body. The collection body located below the collection plate, includes a receiving cavity with a downward aligned, conical-shaped inside surface. The distal end of the collection body converges and forms a hollow neck configured to fit into the wide end opening on a pre-rolled cone.

Located below the collection body is an end cap that includes a centrally aligned bore in which the hollow lower neck formed on the collection body extends. The bore formed on the end cap is wider than the lower neck so that the upper section of a pre-rolled cone may extend around the lower neck. The end cap also includes at least two laterally extending arms that are configured to automatically press against the upper section of the pre-rolled cone pressing the upper section against the sides of the lower neck to hold the pre-rolled cone in place over the lower neck. To release the pre-rolled cone from the lower neck, inward pressure must be applied to the two arms.

The apparatus includes a plunger used to force and pack small particles of plant material into the pre-rolled cone. Optionally, the plunger may be used to agitate or separate small particles on plant material inside the filling cavity.

A user removes the upper end cap from the grinding body and places a small quantity of bulk plant material into the filling cavity during operation. The user then presses the two holding arms inward and inserts the upper section of a pre-rolled cone into the lower opening formed on the end cap and around the lower neck. The user then releases the pressing arms, which hold the pre-rolled cone in place. The user then rotates the upper end cap over the grinding body to grind the bulk plant material into small particles sufficient in size to fall through the holes formed on the collection plate. The small particles are then collected inside the receiving cavity. The user then uses the plunger to force small particles of plant material through the lower neck and into the pre-rolled cone. When the pre-rolled cone is filled, the holding arms are forced inward, enabling the pre-rolled cone to be removed from the apparatus.

Attached to the distal end of the plunger and located inside the receiving cavity is an optional agitator.

BEST MODE FOR CARRYING OUT THE INVENTION

Figure 1:
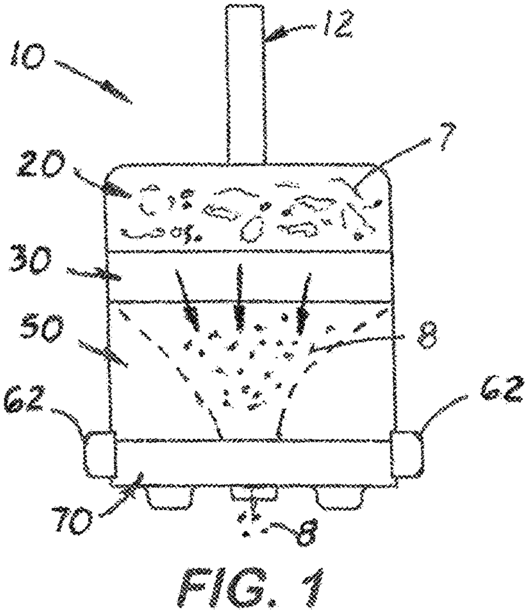
FIG. 1 is a side elevational view of the combination grinder and filling apparatus.
Figure 2:
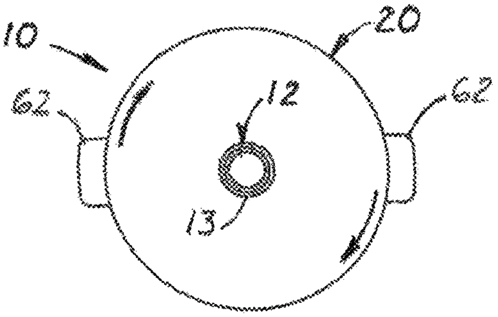
FIG. 2 is a top plan view of the apparatus shown in FIG. 1.
Figure 3:
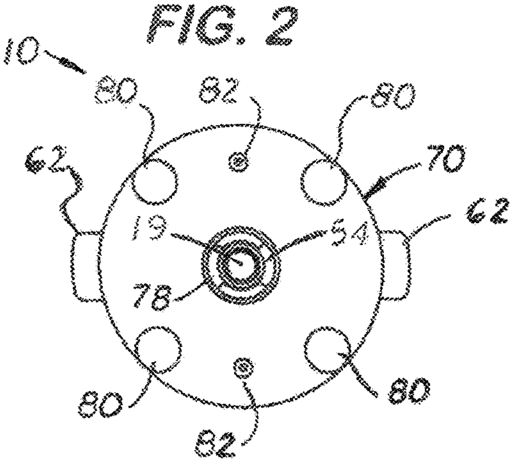
FIG. 3 is a bottom plan view of the apparatus shown in FIG. 1.
Figure 4:
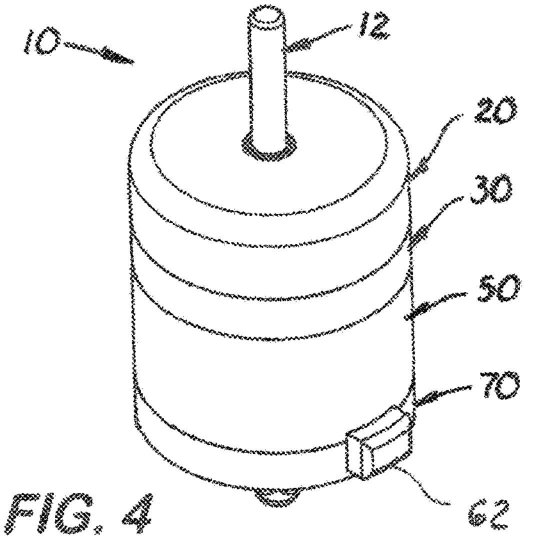
FIG. 4 is a top perspective view of the apparatus shown in FIG. 1.
Figure 5:
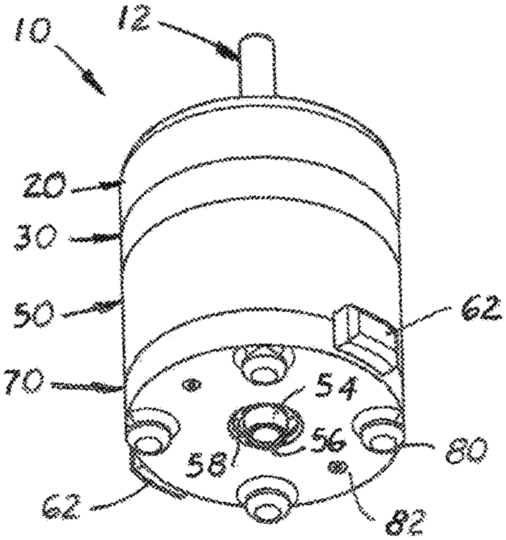
FIG. 5 is a bottom perspective view of the apparatus shown in FIG. 1.
Figure 6:
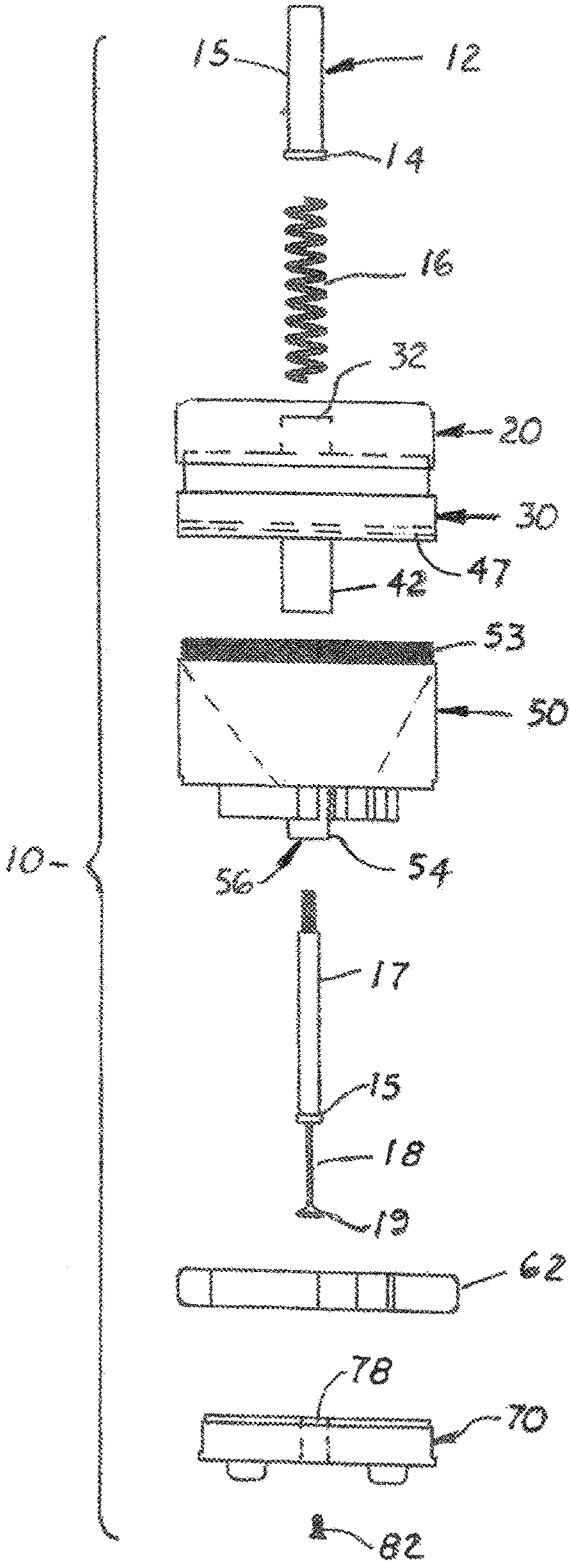
FIG. 6 is an exploded view of the apparatus.
Figure 7:
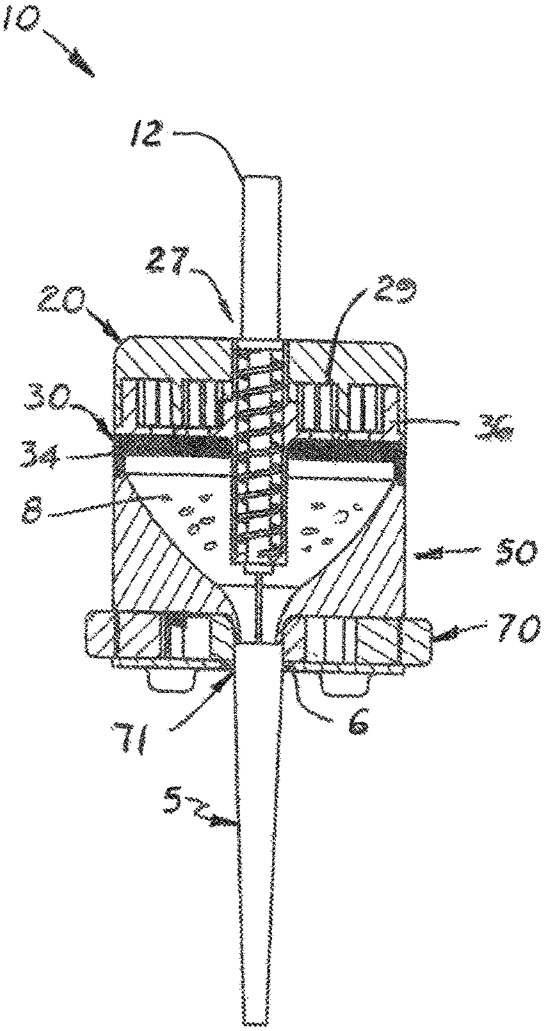
FIG. 7 is a sectional, side elevational view of the apparatus with a pre-rolled cone attached thereto.

FIGS. 1-11 shows a combination grinder and filling apparatus (hereinafter referred to as apparatus 10), used to grind bulk plant material 7 into small particles 8 that can then be deposited into a pre-rolled cone 5.

Apparatus 10 includes an upper end cap 20 mounted over a grinder body 30. The upper end cap 20 and the grinder body 30 are hollow and together form a filling cavity 25, respectively, in which bulk plant material 7 is placed. The grinder body 30 includes an upper neck 31 in which the end cap 20 rests. Located inside the upper neck 31 is a filling cavity 25 configured to receive bulk plant material. The end cap 20 is configured to freely rotate over the grinder body 30. Attached to the inside surfaces of either the upper end cap 20 and/or the grinder body 30 are vertically aligned blades or knives 29, 36, respectively, that cut the bulk plant material 7. When the end cap 20 is rotated over the grinder body 30, bulk material 7 placed into the filling cavity 25 is cut into small particles 8.

In the embodiment shown herein, a plunger 12 is axially aligned on the upper end cap 20. The plunger 12, shown more clearly in FIG. 6, includes an upper section 15 that extends through a bore formed on the upper end cap 20. Formed on the lower end of the upper section 15 is a wide shoulder 14. Attached to the distal end of the upper section 15 is a longitudinally aligned, elongated lower section 17. Disposed around the lower section 17 and pressing against the wide shoulder 14 is a coil spring 16.

The grinder body 30 includes a hollow, axially aligned, center neck 32 and a collection plate 38. The center neck 32 is axially aligned and perpendicular to the collection plate 38. The upper end of the center neck 32 extends upward into the end cap 20. The lower end 42 of the center neck 32 extends downward from the collection plate 38. During assembly, the upper section 15 of the plunger 12 and the coil spring 16 are placed inside the upper end of the center neck 32 (see FIG. 8). The coil spring 16 biases the plunger 12 upward from the end cap 20. The lower section 17 of the plunger 12 extends below the lower end 42 of the center neck 32 and into a receiving cavity 51 located inside the collection body 50, discussed further below.

Figure 8:
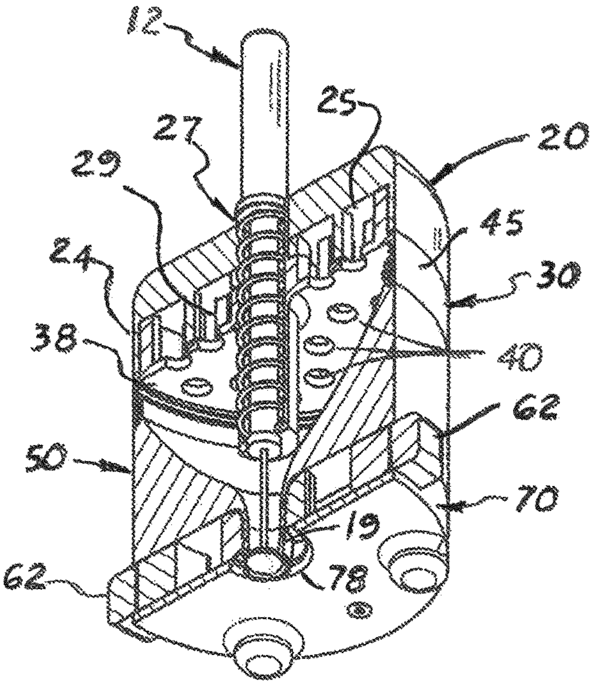
FIG. 8 is a sectional, bottom perspective view of the apparatus.
Figure 9:
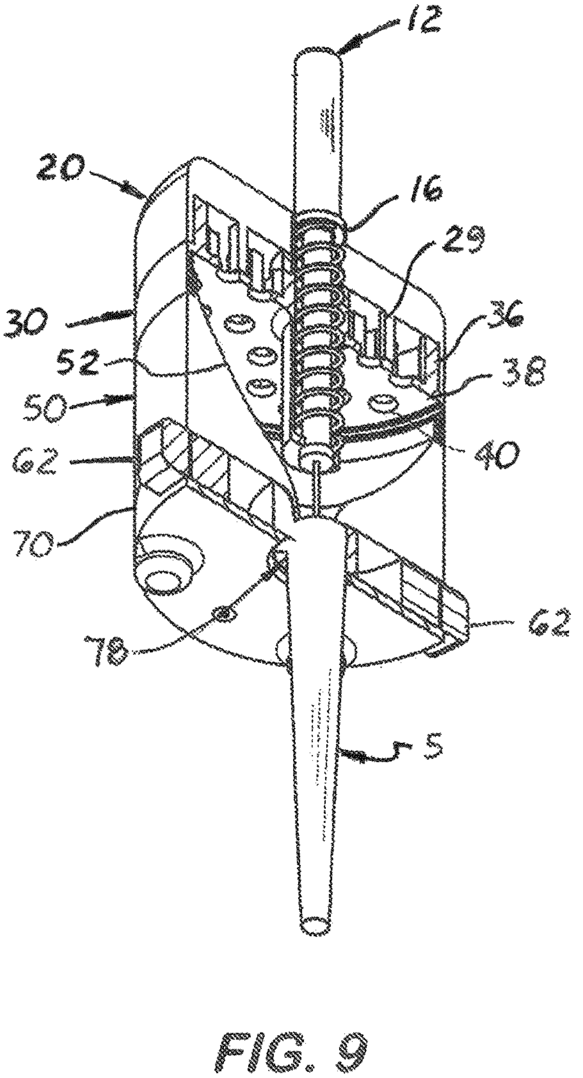
FIG. 9 is a sectional, bottom perspective view of the apparatus with a pre-rolled cone attached thereto.

As shown in FIGS. 8 and 9, the collection plate 38 is transversely aligned on the grinder body 30. The collection plate 38 includes a center bore that receives the center neck 32 and a plurality of small holes 40 (approximately ⅛ to ⅜ inch in diameter). The holes 40 have diameters that allow the small particles of plant material 8 formed in the filling cavity 25 to automatically fall into the receiving cavity 51 located inside the collection body 50. Particles larger than the holes 40 are left in the filling cavity 25.

A collection body 50 is attached to the lower edge of the grinder body 30 configured to direct small particles of plant material into a center bore 56 in a narrow lower neck 54 formed on the collection body 50. The collection body 50 includes external threads 53 configured to mesh with internal threads 47 formed on the lower edge of the grinder body 30. The collection body 50 includes downward, conical-shaped inside sidewalls 52 that converge and terminate at the lower neck 54.

Attached to the bottom edge of the collection body 50 is a lower end cap 70 with a wide centrally aligned bore 78. When assembled, the lower neck 54 formed on the collection body 50 extends into bore 78. The bore 78 has a diameter greater than the lower neck 54, allowing the upper section of a pre-rolled cone 5 to be inserted through bore 78 and placed a short distance around the lower neck 54.

Figure 10:
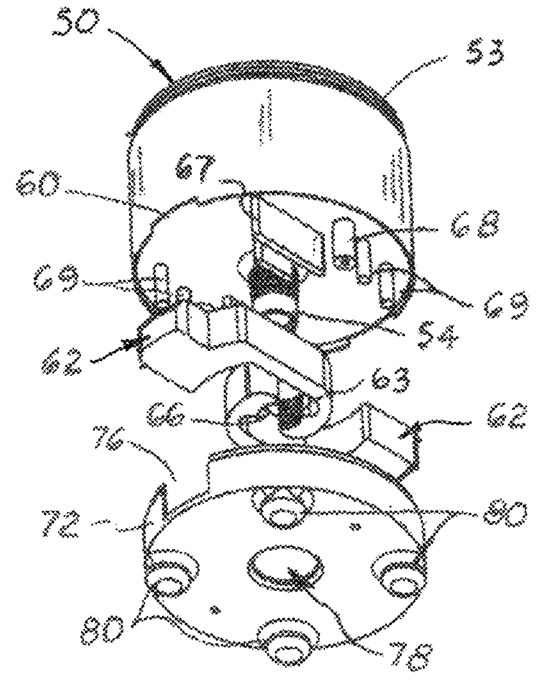
FIG. 10 is an exploded, bottom perspective view of the collection body and the lower cap.
Figure 11:
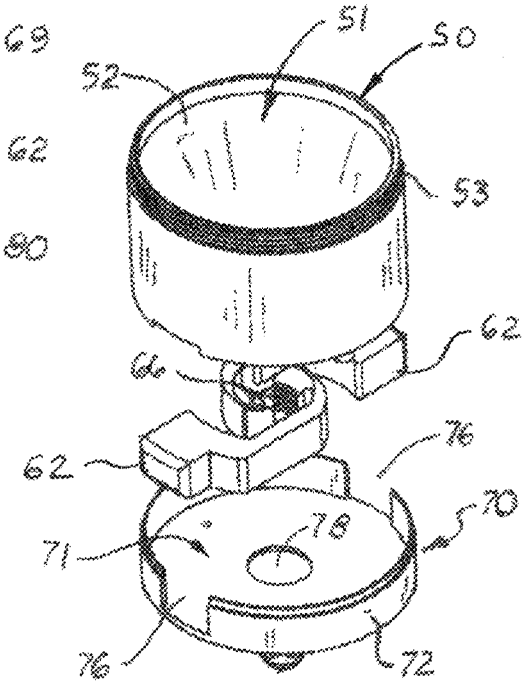
FIG. 11 is an exploded, top perspective view of the collection body and the lower cap.

The lower end cap 70 includes an upward extending sidewall with two slot openings 76. Formed inside the lower end cap 70 is a hollow cavity 71. Extending transversely through the two slot openings 76 on opposite sides of the lower cap 70 are two laterally extending arms 62. Each arm 62 is c-shaped and includes a curved contact surface 66 that extends around the opposite sides of the lower neck 54. The two arms 62 are biased outward by a spring 63 (FIG. 10 shows one spring 63, the second spring is hidden and located on the opposite side) that automatically forces the arms 62 apart and outward from the slot openings 76 formed on the lower end cap 70 Because the contact surface 66 of each arm 62 extends around the opposite side of the lower neck 54, the springs 63 automatically press the contact surfaces 66 against the opposing sides of a pre-rolled cone 5 thereby holding the cone 5 on the lower neck 54.

Formed on the bottom surface of the collection body 50 are one or more alignment plates 67 and alignment pins 69 that extend downward and hold the two arms 62 in opposing, transverse alignment on the lower end cap 70. One or more screws 82 extend through the lower end cap 70 and attach to downward extending standoffs 68 formed on the lower end of the collection body 50. Formed on the bottom surface of the lower end cap 70 are optional feet 80 that may be used to support the apparatus 10 on a flat surface.

In the embodiment shown herein, the pressing arms 62 are configured automatically hold the cone 5 onto the lower neck 54 and must be selectively pressed inward to disengage the pressing arms 62 thereby allowing the cone 5 to be removed from the lower neck 54. This feature allows the user to use one hand to hold grinder body 30 and collection body 50 and use the opposite hand to rotate the end cap 20.

During operation, a user removes the upper end cap 20 and places a small quantity of bulk plant material 7 inside to make at least one cigarette into the filling cavities 25 formed inside the grinder body 30. The user then presses the two pressing arms 62 inward and inserts the upper section 6 of a pre-rolled cone 5 into the lower opening 78 formed on the lower end cap 70 and around the lower neck 54. While holding the collection body 50 with one hand, the other hand is used to rotate the end cap 20 to cut the bulk plant material 7 into small particles of plant material 8. The plunger 12 is then used to force the small particles of plant material 8 into the pre-rolled cone 5. When the pre-rolled cone 5 is filled with small particles of plant material 8, the user then forces the pressing arms 62 inward and disengages the contact surfaces 66 from the lower neck 54 and upper section 6 of the pre-rolled 5. The pre-rolled cone 5 filled with small plant material 8 can then be removed from the lower neck 54.

During use, tiny particles of plant material 8 may become lodged inside the receiving cavity 51 formed in the collection body 50. To facilitate downward movement of plant material 8 from receiving cavity 51, an optional agitator 100 is attached to the end of the peg 18 configured to break apart the plant material 8.

Figure 12:
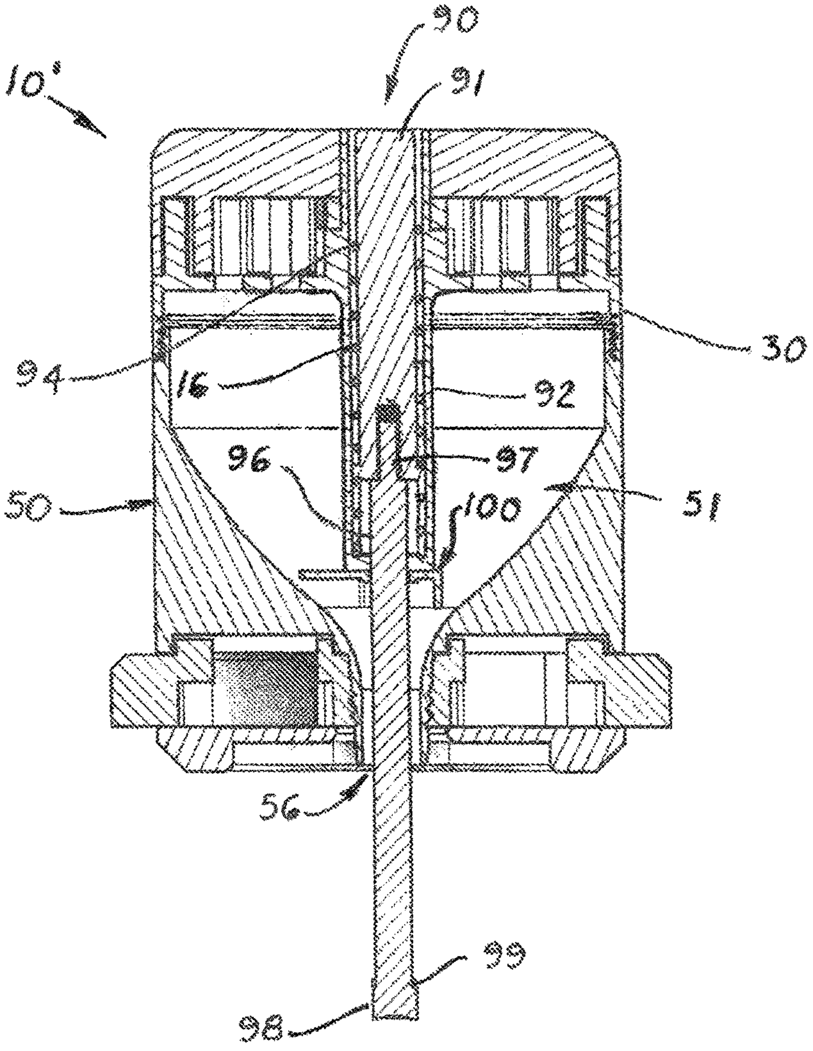
FIG. 12 is a sectional, side elevational view of the apparatus with the plunger retracted and showing an optional agitator mounted on the peg inside the receiving cavity.
Figure 13:
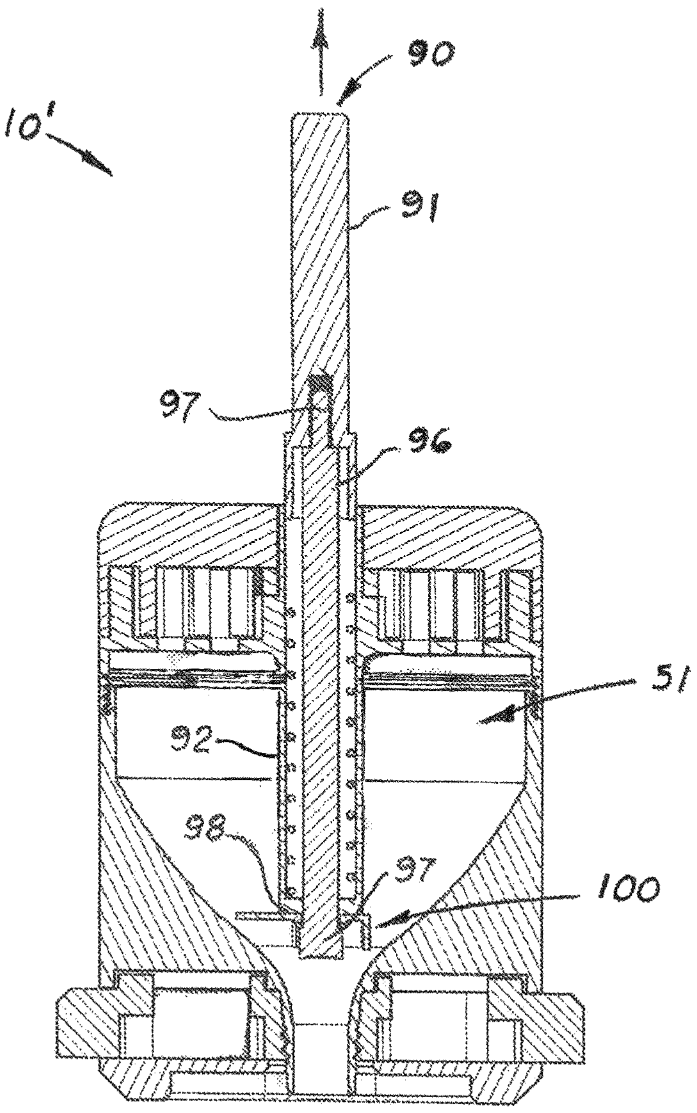
FIG. 13 is a sectional, side elevational view of the apparatus with the plunger pressed inward that forces the peg outward from the lower end cap and sliding through the agitator attached located inside the receiving cavity.
Figure 14:
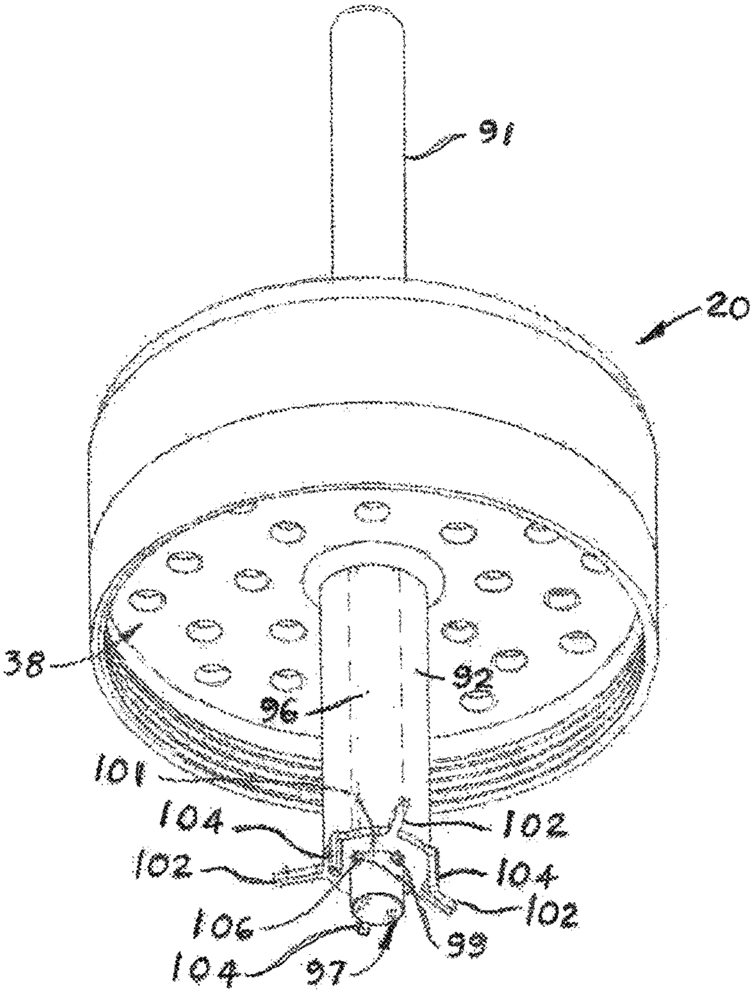
FIG. 14 is a bottom perspective view of the collection body.

FIGS. 12-14 shows a sectional side elevational view of apparatus 10' with an optional agitator 100 mounted on a modified peg 96 affixed to the upper section 91 on the plunger 90. The modified peg 96 is used in place of peg 18 shown in FIG. 6. The apparatus 10' also uses a modified upper end cap 20' includes an elongated collection neck 92 that extends further into the receiving cavity 51 than neck 32 used with the previous embodiment. Formed on the distal end of the modified peg 96 is an end cap 97 with outward extending keys 99.

The agitator 100 is a disc-like structure with a center bore 101 that allows the agitator 100 to slide up and down axially on the modified peg 96. Attached or formed on the agitator 100 are laterally extending and downward extending arms 102, 104, respectively. Formed on the inside edge of the center bore 101 are keyways 106 designed to engage outward extending keys 99 formed on the outside surface of the end cap 97. When the modified peg 96 is resting, the spring 16 pulls the end cap 97 upward, forcing the keys 99 against the agitator 100 and into the keyways 106 to radially lock the agitator 100 to the modified peg 96. When the modified peg 96 is forced upward, the modified peg 96 and the agitator 100 are automatically locked together. When the upper section 91 of the plunger 90 is manually rotated, the agitator 100 rotates inside the receiving cavity 51 to break apart small particles of plant material 8.

When the plunger 90 is forced downward, the modified peg 96 is forced downward. The modified peg 96 slides freely past the agitator 100, thereby disengaging keys 99 from the keyways 106. The end cap 97 may then force small particles 8 into a pre-rolled cone 5 attached to the lower neck 54. When the downward force on the plunger 90 is removed, the modified peg 96 automatically retracts inside the collection body 50, and the end cap 97 presses against and reengages the agitator 100.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

INDUSTRIAL APPLICABILITY

This invention has utility in industries that use an apparatus for filing narrow tubes with materials that must undergo grinding into small particles before being filed into the tube, such as the smoking and food industries.

I claim:

1. A combination grinder and filling apparatus, comprising:

a. a grinder body with a filling cavity;

b. a rotating upper end cap mounted over the grinder body;

c. a plurality of knives or blades located inside the filling cavity configured to cut bulk plant material deposited inside the filling cavity when the upper end cap is rotated over the grinder body;

d. a collection plate located under the grinder body, the collection plate includes a plurality of holes that allow particles of material cut inside the grinder body to pass through;

e. collection body located under and attached to the grinder body, the collection body includes a receiving cavity with a conical-shaped inside surface that extends downward and forms a lower neck with a center bore;

f. a lower end cap located under and attached to the collection body, the lower end cap includes a lower bore in which the lower neck on the collection body extends, the lower bore being larger in diameter than the lower neck enabling an end of a pre-rolled cone to be inserted into the lower bore and extended around the lower neck;

g. At least two pressing arms formed on the lower end cap configured to hold the pre-rolled cone around the lower neck, and h. a plunger configured to extend through the upper end cap and the grinder body and into the receiving cavity in the collection body, the plunger includes a lower peg configured to force particles of plant material deposited into the receiving cavity of the collection body into the pre-rolled cone placed around the lower neck.

2. A combination grinder and filling apparatus as recited in claim 1, wherein the plunger is biased upward from the upper end cap.

3. The combination grinder and filling apparatus as recited in claim 2, further including an agitator configured to selectively engage on an end of the plunger located inside the receiving cavity, the plunger configured to selectively rotate and thereby rotate the agitator inside the receiving cavity.

4. The combination grinder and filling apparatus as recited in claim 1, further including a center neck extending through the grinder body in which the plunger is axially aligned and travels longitudinally therein.

5. A combination grinder and filling apparatus as recited in claim 4, wherein the plunger is biased upward from the end cap by a spring.

6. The combination grinder and filling apparatus as recited in claim 1, wherein each of the pressing arms is biased outward and automatically presses against the lower end and holds an end of the pre-rolled cone inserted around the lower end.

7. The combination grinder and filling apparatus as recited in claim 1, wherein each of the least two pressing arms is c-shaped and includes a contact surface configured to press against an opposite side of the lower neck.

8. The combination grinder and filling apparatus as recited in claim 7, further including at least one spring configured to force each of the at least two pressing arms outward from the lower end cap.

9. The combination grinder and filling apparatus as recited in claim 1, wherein each of the plurality of holes formed in the collection plate has a diameter between ⅛ to ⅜ inch.

10. The combination grinder and filling apparatus as recited in claim 1, further including an agitator configured to selectively engage on an end of the plunger located inside the receiving cavity, the plunger configured to selectively rotate and thereby rotate the agitator inside the receiving cavity.

11. The combination grinder and filling apparatus as recited in claim 10 wherein the agitator engages from the end of the plunger when the plunger is forced upward from the upper end cap and disengages from the end of the plunger when the plunger is forced downward in the receiving cavity.

* * * * *